United States Patent [19]
Iwata

[11] Patent Number: 6,157,324
[45] Date of Patent: Dec. 5, 2000

[54] ANALOG TO DIGITAL VOICE TRANSMITTER

[75] Inventor: Shinichiro Iwata, Tokyo, Japan

[73] Assignee: NEC Corporation, Tokyo, Japan

[21] Appl. No.: 09/190,239

[22] Filed: Nov. 13, 1998

[30] Foreign Application Priority Data

Nov. 26, 1997 [JP] Japan ................................. 9-324524

[51] Int. Cl.[7] .................................................. H03M 5/00
[52] U.S. Cl. ........................................ 341/55; 379/93.08
[58] Field of Search .................................. 341/50, 55, 60; 370/212; 379/93.15, 93.08

[56] References Cited

U.S. PATENT DOCUMENTS

| | | | |
|---|---|---|---|
| 4,512,026 | 4/1985 | Vander Meiden ................... | 375/114 |
| 5,128,792 | 7/1992 | Teich et al. ........................ | 359/161 |
| 5,796,716 | 8/1998 | Smith ................................. | 370/207 |
| 5,825,830 | 10/1998 | Kopf .................................. | 375/340 |
| 5,835,036 | 11/1998 | Takefman .......................... | 341/95 |
| 5,905,756 | 5/1999 | Lamkin et al. .................... | 375/222 |
| 5,912,752 | 6/1999 | Mollett et al. .................... | 359/137 |

FOREIGN PATENT DOCUMENTS

2 275 853   9/1994   United Kingdom ........... H04M 11/06

*Primary Examiner*—Peguy Jean Pierre
*Attorney, Agent, or Firm*—McGinn & Gibb, P.C.

[57] ABSTRACT

An analog to digital voice transmitter which converts analog voice to digital voice data. The transmitter contains a converter for converting digital voice data which corresponds to control data codes, to non-control data. In one embodiment, an ADPCM encoder encodes inputted analog voice signals to ADPCM digital voice codes. A S/P converter converts serial signals to parallel signals of the byte unit. A code converter detects codes to be removed which exist in the ADPCM data of the byte unit and converts the codes to be removed to a code not to be removed by adding or subtracting a data value of 1 to the code to be removed. A transmission FIFO memory stores the ADPCM data in order. A P/S converter converts the parallel data of the byte unit to the serial signals. A transmitting section transmits the serial data in infrared rays to a receiver.

18 Claims, 7 Drawing Sheets

ANALOG TO DIGITAL VOICE TRANSMITTER

BACKGROUND OF THE INVENTION

The present invention relates to a voice transmitter which in particular transmits in real time voice data coded in digital by using a transmitting process inserting an escape code in a transmission frame to secure data transmitability.

DESCRIPTION OF THE RELATED ART

There are many systems which convert analog voice signals to digital codes, one of them is an ADPCM (adaptive differential pulse code modulation) system. Actually it is realized by the following method.

Figure 1:
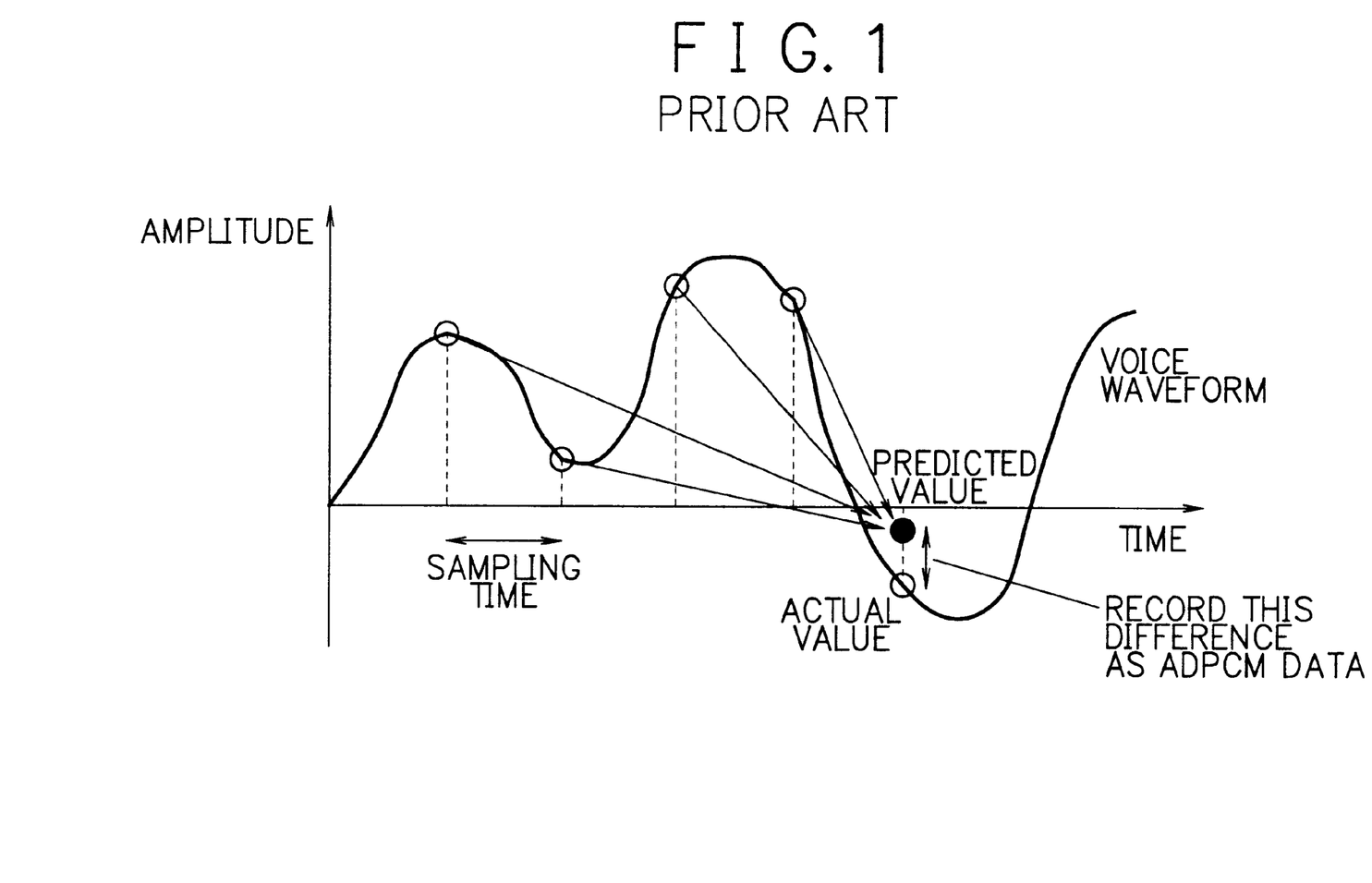
FIG. 1 is a diagram showing a recording method of a voice waveform by the ADPCM system of the conventional type.

A voice waveform has comparative regularity, it is known that voice waveform amplitude at some time is predictable from previous waveform to a degree. Therefore at the ADPCM system, as FIG. 1 shows, as data at some time, the differential value between the predicted value from a few previous sampling values and the sampling value actually at the time is recorded. The sampling means the operation at an analog waveform is converted to digital code in a certain cycle (sampling frequency) by analog/digital conversion and the sampling value means the value of the digital code. The number of bits of the digital code at the time of the analog/digital conversion is the number of sampling bits.

As a concrete example, at the PHS (personal handy phone system) (ARIB STD-28), in this the PHS is a mobile telephone system, the sampling frequency is 8 kHz, the number of the sampling bits is 15 bits and the number of bits of one sample data (differential value) of the ADPCM system is 4 bits. Therefore the data rate is 32 kbps, 32 kbps=8 kHz×4 bits.

As one of the transmission systems which transmit digital voice data in real time, there is an IrDA (infrared data association) system utilizing infrared rays. The IrDA system is a communication system utilizing the characteristic of infrared rays, applying a half-duplex communication channel physically and using a variable length frame. This IrDA system is described in the 10. 1. 3 ASYNC Transparency of Serial Infrared Link Access Protocol Version 1. 1, Jun. 16, 1996, published by Infrared Interface Association. The system using the variable length frame is different from the system using the fixed length frame and needs a structure that a receiver is able to recognize the beginning and ending of the received frame. Therefore the IrDA system decides a BOF code (C0h) showing a beginning of frame and a EOF code (C1h) showing an ending of frame. The receiver recognizes the beginning of frame at the time received the BOF code and the ending of frame at the time received the EOF code.

However, with only the above mentioned structure, at the case that the same codes of the BOF and the EOF are included in the data, the receiver can not judge whether the content is data or the BOF and EOF codes. Therefore the data including the same codes of the BOF and EOF in the data are not able to be transmitted normally.

At the case these BOF and EOF codes are included in the data, a control escape CE code (7Dh) being an escape code is put right before these BOF and EOF codes, and at the right after these BOF and EOF codes, the value (E0h or E1h) which is operated exclusive OR with 20h and the BOF or EOF code is put. At the case that the CE code is also included in the data, the receiver can not judge whether the content is data or the CE code, therefore at the case the CE code is included in the data, a CE code is put right before the original CE code and at the right after the CE code, the value (7Dh) which is operated exclusive OR with 20h and the CE code is put. As mentioned above, at the case that the codes to be escaped are included, the CE code of 1 byte is attached to each code to be escaped, therefore the transmission of total 2 bytes is needed.

At the time when the receiver receives the CE code (7Dh), the receiver gets rid of the CE code (7Dh) and stores the values operated exclusive OR with 20$h$ as received data. The above mentioned operation is a technology to secure the transmitability of the data described in the above mentioned literature, with this, the IrDA system using variable length frame enables the transmission of the ADPCM data using all codes.

Figure 2:
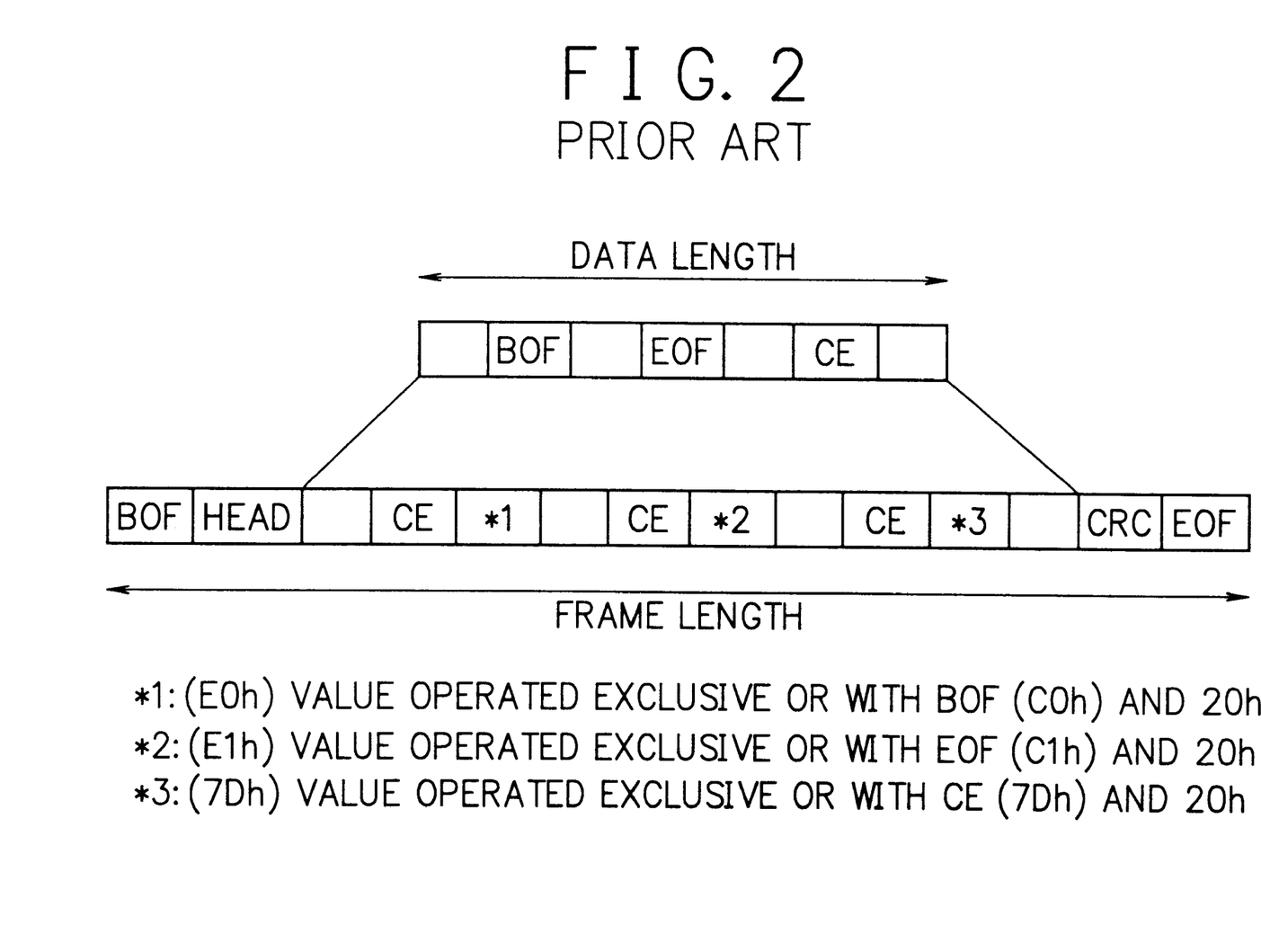
FIG. 2 is a diagram showing the frame structure in a voice transmitting process by the ADPCM system.

In the frame of the IrDA system, in addition to the BOF, EOF and CE are inserted, a CRC (cyclical redundancy check) checking frame and a header being information using the transmitting process itself are included, therefore the construction of the total frame becomes like as the drawing showing in FIG. 2.

Figure 3:
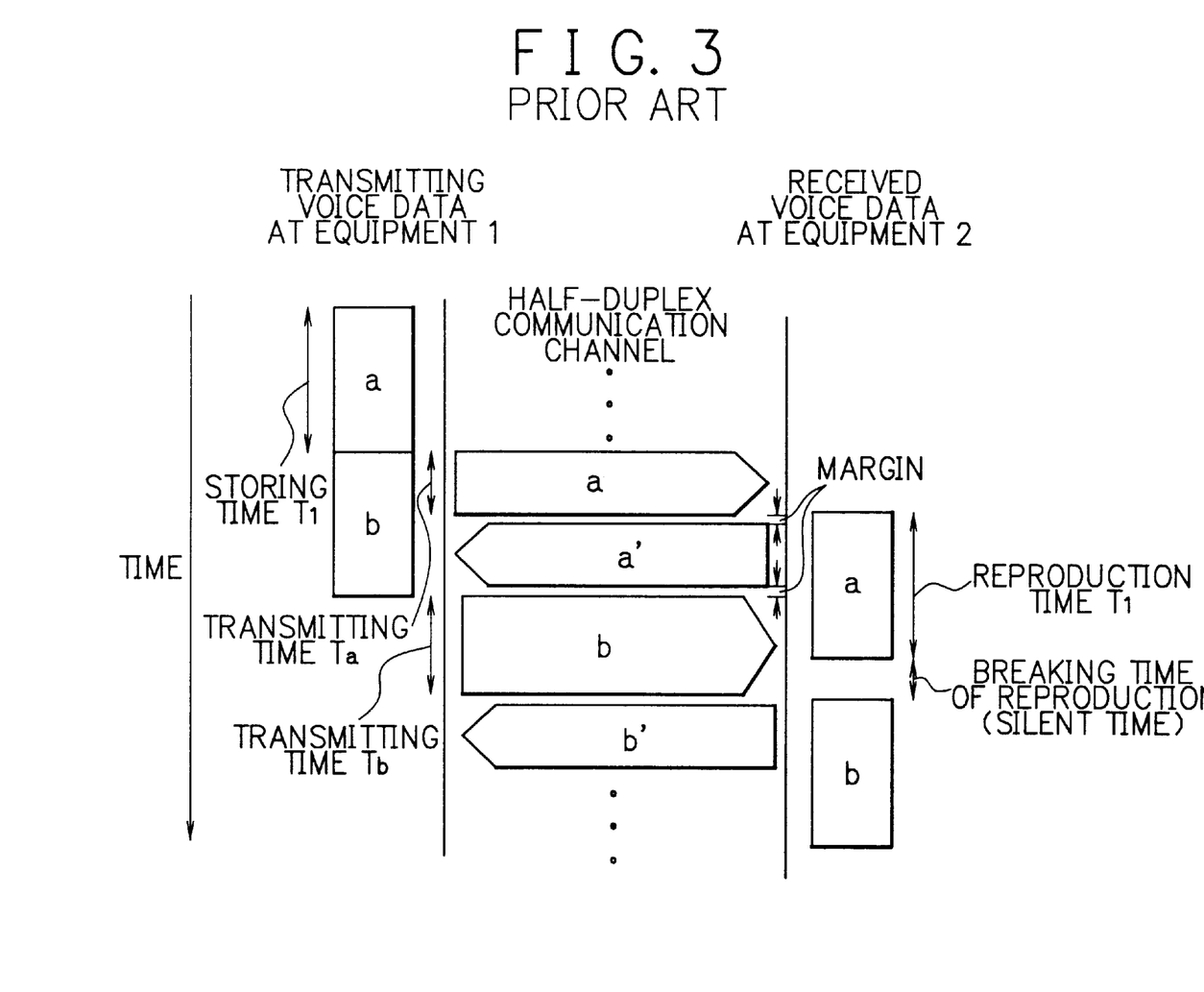
FIG. 3 is a diagram showing the voice transmitting process by the ADPCM system.

At the half-duplex transmitting process like the IrDA system, at the case that the digital voice data of two way real time (full duplex) are transmitted, a communication channel which has a transfer rate being at least more than double of the baud rate of the digital voice data is needed. As shown in FIG. 3, this comes because the voice reproduction is continuously implemented in two way and the frame transmission of a round-trip must be implemented, in the voice reproduction of one frame.

As an example, the baud rate of the ADPCM data is 32 kbps, the transfer rate of the communication channel is 115.2 kbps, the voice data in one frame is 160 samples (160×4 bits=80 bytes) and the total number of bytes of the frame including BOF, EOF, header and CRC is 90 bytes are set. Storing time ($T_1$) and reproduction time ($T_1$) of the 160 samples (80 bytes) of the ADPCM data frame becomes 20 msec, (160 samples×4 bits)/32 kbps. Transmitting time (Ta) of one frame 90 bytes at the case that the escape code CE is not inserted becomes 7.8 msec, (90 bytes×10 bits)/115.2 kbps=7.8 msec. In this, 1 byte=10 bits is set, because 1 bit of a start bit and 1 bit of stop bit are needed per 1 byte in the communication channel of the start-stop synchronous system. Under the above mentioned condition, within 20 msec of the voice reproduction time of 1 frame, the frame transmission of one round-trip is able to be implemented and 20 msec−7.8 msec×2=4.4 msec becomes a margin for the frame processing time at the transmitter and the receiver and for the additional transmitting time at the case inserted of the escape CE code.

The above mentioned problem of the conventional technology has some possibility that the breaking of voice reproduction, that is, silent time occurs at the real time voice transmission.

At the case that the codes to be escaped such as the same codes of BOF, EOF and CE are included many in the voice data, the total number of bytes of the frame is increased as shown in FIG. 2, therefore as shown in FIG. 3, the transmitting time is increased and even after finishing the voice reproduction of a frame, the next frame does not arrive and the time that the data to be reproduced does not exist occurs.

To avoid this, the method making the margin large beforehand is applicable, however it is clear from the above mentioned formula that to realize this method, the transfer rate of the communication channel must be made higher in large degree for the baud rate of the digital voice data and the small size and low consumption power of an equipment will not be realized.

The method excluding the codes to be escaped themselves is applicable, however the discontinuity of the voice data causes the deterioration of the voice quality.

SUMMARY OF THE INVENTION

It is therefore an object of the present invention to provide a voice transmitter which does not make a transfer rate of a communication channel high in large degree for a baud rate of digital voice data and minimizes the deterioration of voice quality and does not make the breaking of voice reproduction, that is, silent time occur while a voice is transmitted in real time.

To solve the above mentioned problems, in a voice transmitter which transmits digital voice coded data encoded digital voice data obtained by sampling of an analog voice waveform and uses a transmitting process utilizing escape codes as a means for implementing data transmission of codes equivalent to control codes used in a communication channel, the present invention provides a code converter means which detects data equivalent to codes to be escaped from said digital voice coded data and at the case of equivalent converts said digital voice coded data to codes not to be escaped.

The present invention also provides a substituting means for substituting different data of the nearest value of said digital voice coded data at the numericalized case for said digital voice coded data in said code converter means.

Said digital voice coded data of the present invention are generated by an ADPCM system.

Said digital voice coded data of the present invention are also generated by a PCM system.

Said code converter means of the present invention converts said codes to be escaped to said codes not to be escaped. With this, escape codes are not inserted to the voice data in the transmission frame, the increase of transmission time is lessened and the situation that the data to be reproduced do not exist and the breaking of voice reproduction occurs is prevented Furthermore, only 1 value of digital voice data is added or subtracted in the code conversion, therefore the influence on the voice waveform is minimized and the influence on the voice quality is small at the reproduction of voice.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 4:
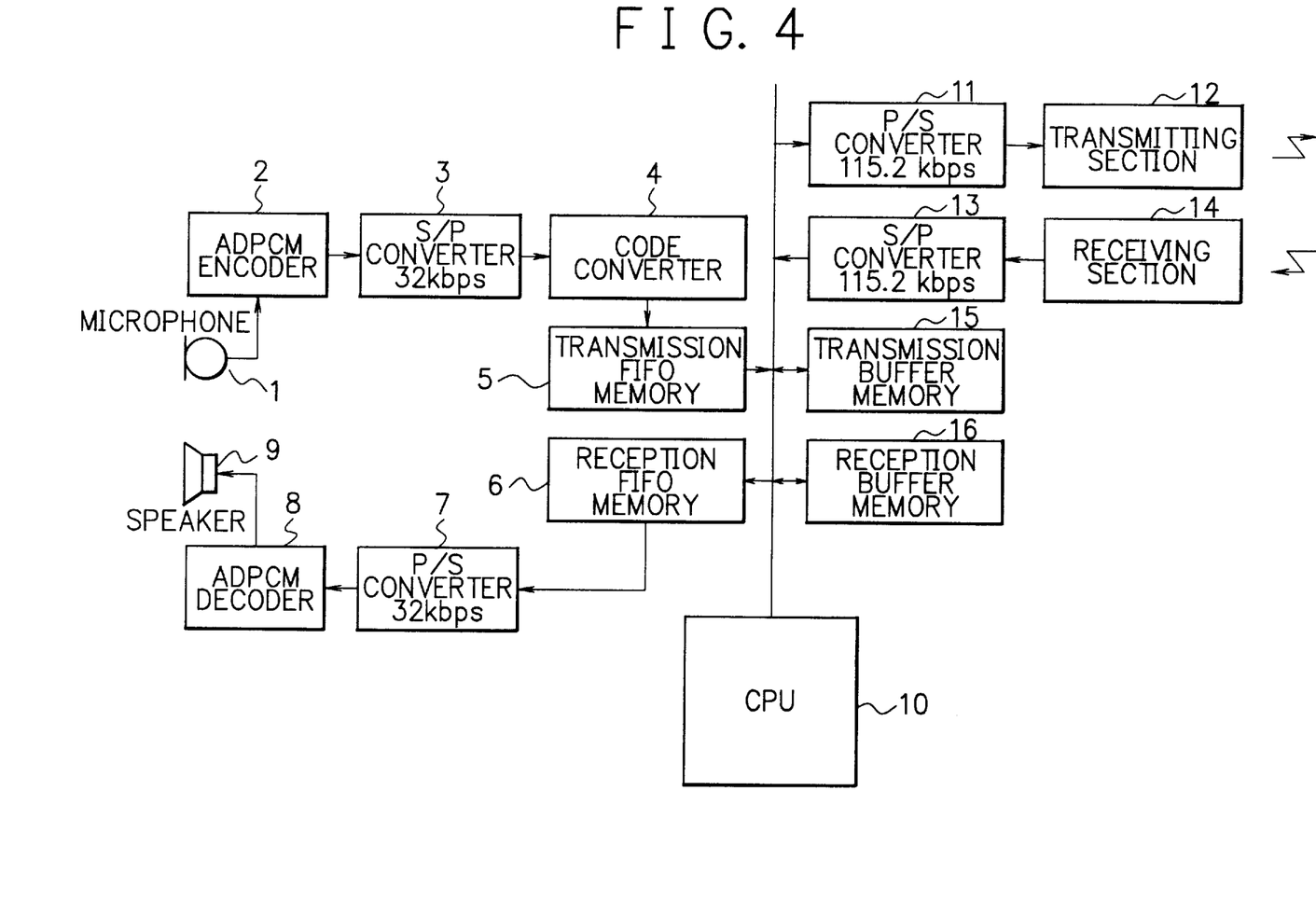
FIG. 4 is a block diagram showing a first embodiment of a voice transmitter of the present invention.

Referring now to the drawings, embodiments of the present invention are explained in detail. FIG. 4 is a block diagram showing a first embodiment of a voice transmitter of the present invention. A microphone 1 converts a voice to an analog voice signals. An ADPCM encoder 2 converts the inputted analog voice signals to ADPCM digital voice codes of 32 kbps. A S/P converter (serial/parallel converter) 3 converts serial signals of 32 kbps to parallel signals making two samples one byte, in this, upper four bits are an odd sample and lower four bits are an even sample. A code converter 4 detects the codes to be escaped BOF (C0h), EOF (C1h) and CE (7Dh) and converts them to the codes not to be escaped D0h, D1h and 7Eh respectively, at the case that the codes to be escaped BOF (C0h), EOF (C1h) and CE (7Dh) are included in the ADPCM data in the byte unit. A transmission FIFO (first in first out) memory 5 stores the ADPCM data in order. A transmission buffer memory 15 stores temporarily an IrDA frame actually transmitting attached BOF, EOF, header and CRC, etc. for the ADPCM data. A P/S converter (parallel/serial converter) 11 converts the parallel data to serial signal data of 115.2 kbps which a start bit and a stop bit are attached in the parallel data of the byte unit. A transmitting section 12 transmits the serial signal data in infrared rays to a receiver. A receiving section 14 detects the infrared rays from a transmitter and converts them to the serial signal data. A S/P converter (serial/parallel converter) 13 converts the serial signal data of 115.2 kbps to the parallel signal data of the byte unit. A reception buffer memory 16 is used for storing the received IrDA frame. A reception FIFO memory 6 stores the received ADPCM data. A P/S converter (parallel/serial converter) 7 converts the ADPCM data of the byte unit to the serial signal data of 32 kbps. An ADPCM decoder 8 decodes the ADPCM digital voice signals of 32 kbps to analog signals. A speaker 9 outputs the analog signals. A CPU 10 implements the data transmission between each FIFO memory and each buffer memory and assembles and analyzes the IrDA frame.

Next, the operation of the first embodiment of the present invention is explained. First referring to FIG. 4, the operation of the voice transmission is explained.

The analog signals outputted from the microphone 1 are encoded to the ADPCM codes of 32 kbps by the ADPCM encoder 2. These serial signals are converted to the parallel data making two samples of the ADPCM data one byte at the S/P converter 3. These converted data are stored in the transmission FIFO memory 5 in order through the code converter 4. At the code converter 4, the codes to be escaped BOF (C0h), EOF (C1h) and CE (7Dh) are detected and are converted to the codes not to be escaped (D0h), (D1h) and (7Eh) one by one. At the time when the 160 samples (80 bytes) of the ADPCM data per one frame are stored in the transmission FIFO memory 5, an interruption signal is generated to the CPU 10, then the CPU 10 received this signal transmits these 80 bytes from the transmission FIFO memory 5 to the transmission buffer memory 15 in order of storing. The CPU 10 attaches the BOF, EOF, header, CRC, etc. to the ADPCM data read in the transmission buffer memory 15 and constitutes the IrDA frame. Furthermore, the CPU 10 transmits in the byte unit the IrDA frame to the P/S converter 11 and the transmitting section 12 transmits the infrared rays data as the serial signals to a receiver.

Next, referring to FIG. 4, the operation of the voice reception is explained. The infrared rays data received at the receiving section 14 are converted to the data of the byte unit at the S/P converter 13 and are stored in the reception buffer memory 16 by the CPU 10. After finishing the reception of one frame, the CPU 10 transmits the 160 samples (80 bytes) of the ADPCM data in the frame to the reception FIFO memory 6. From the reception FIFO memory 6, the data are read in the P/S converter 7 in the byte unit one by one and the data are converted to the serial signals of 32 kbps. These ADPCM digital codes of 32 kbps are converted to the analog signals at the ADPCM decoder 8 and reproduced at the speaker 9.

Figure 5:
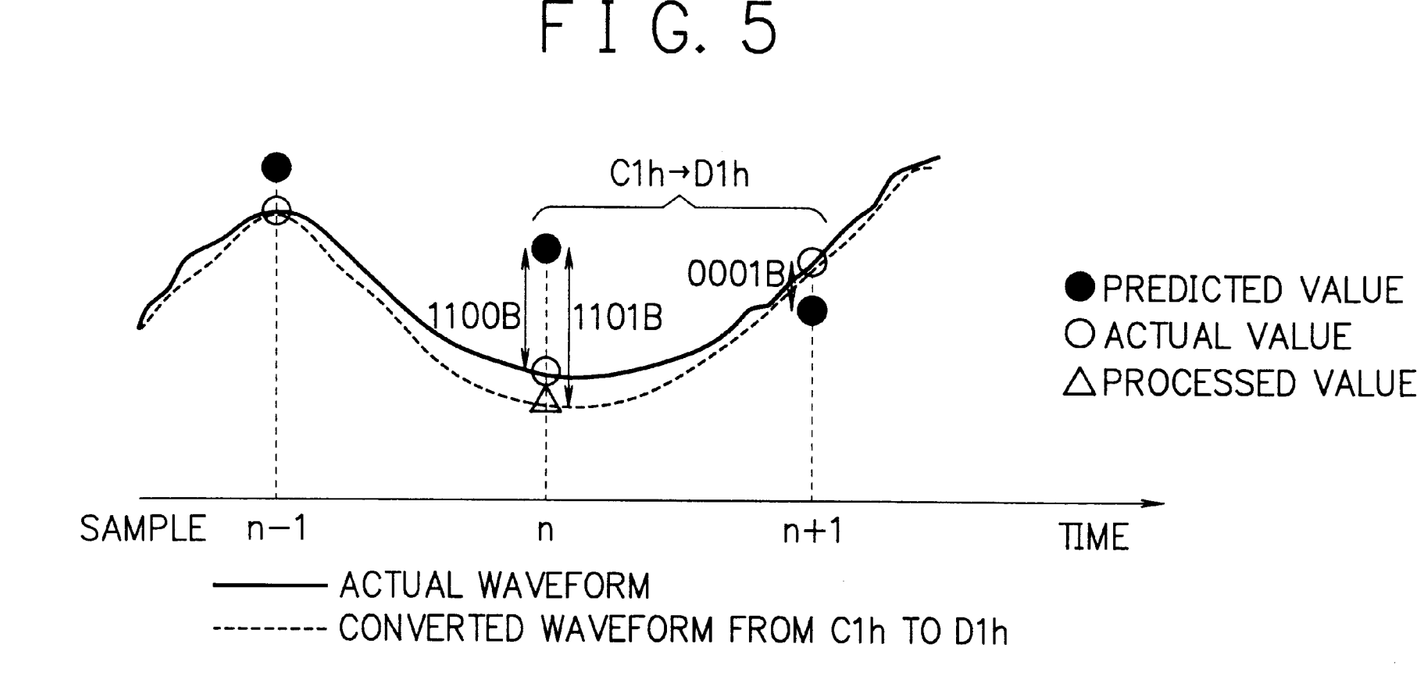
FIG. 5 is a diagram showing an effect for a voice waveform by the code conversion of the first embodiment of the present invention.

One sample of the ADPCM is four bits, therefore in the one byte data, the data of two samples constituting of upper four bits and lower four bits are included. At the code converter 4, C0h is converted to D0h, C1h is converted to D1h and 7Dh is converted to 7Eh, this means that only 1 value of the sample value (actual value) expressed by the upper four bits is changed to the processed value. In this process, the changing is minimum, therefore the waveform converted from the codes to be escaped to the codes not to be escaped is only changed slightly from the actual waveform. FIG. 5 shows the waveform that C1h is converted to D1h, a line shows the actual waveform and a dotted line shows the converted waveform from C1h to D1h. Numerical figures 1100B, 1101B and 0001B show figures in the binary system.

Actually, only 3 codes in 256 codes (00h to FFh) are converted, therefore the deterioration of voice quality hardly occurs by the conversion.

Figure 6:
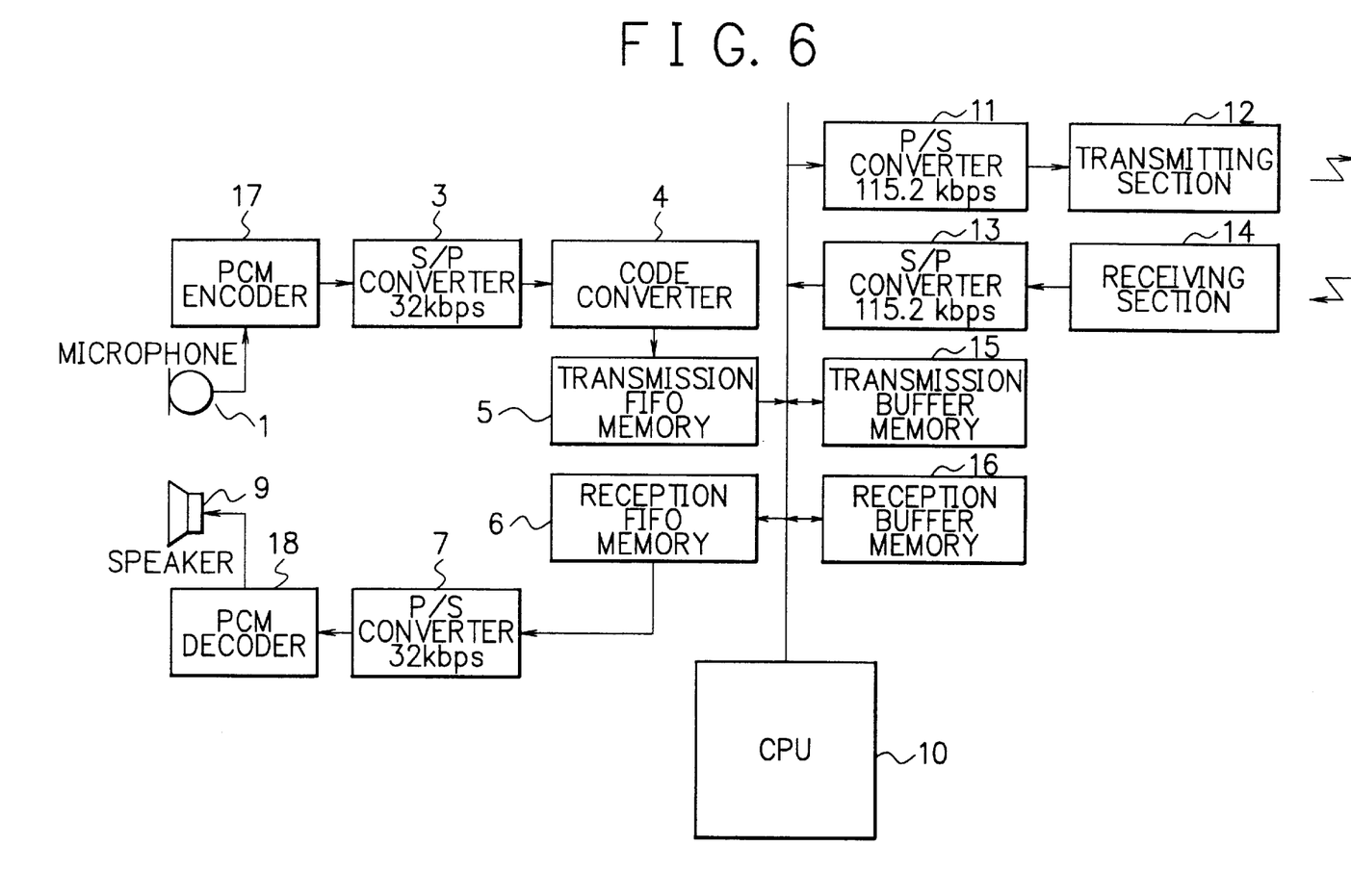
FIG. 6 is a block diagram showing a second embodiment of a voice transmitter of the present invention.

Next, a second embodiment of the present invention is explained in detail. FIG. 6 is a block diagram showing the second embodiment of the voice transmitter of the present invention. The difference from the first embodiment is that the PCM (pulse code modulation) system is adopted instead of the ADPCM system, as a conversion system converting the analog voice signals to the digital codes. The PCM system is the system that the sampling values sampled the analog voice themselves are utilized as the data. The construction of the second embodiment is the same as the first embodiment except the ADPCM encoder and decoder are replaced by the PCM encoder and decoder, therefore the same sign numbers are attached to the same functions and the same explanation is omitted.

Figure 7:
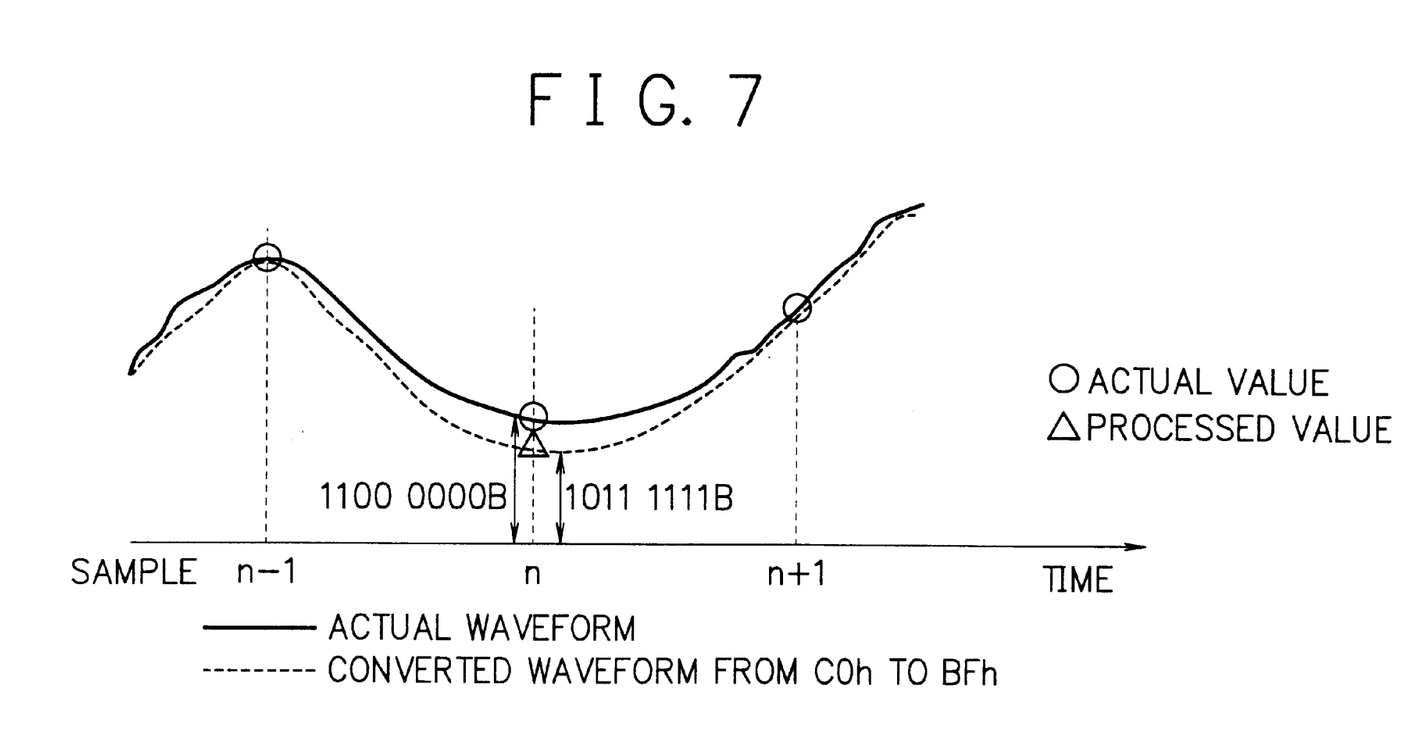
FIG. 7 is a diagram showing an effect for a voice waveform by the code conversion of the second embodiment of the present invention.

As an example, the number of the sampling bits is set to be 8 bits, therefore 1 bytes is needed to 1 sample data of the PCM data. At the first embodiment, the ADPCM system determined that 1 sample data was 4 bits, therefore the code converter 4 converted the codes to be escaped C0h to D0h, C1h to D1h, 7Dh to 7Eh, however in the PCM system, 1 sample data is 1 byte and only the least significant bit of 1 byte is added or subtracted 1 value. Actually, the code converter 4 converts the codes to be escaped at the PCM system C0h to BFh, C1h to C2h, 7Dh to 7Eh. FIG. 7 shows the waveform change at the time when the C0h is converted to the BFh, a line shows the actual waveform and a dotted line shows the converted waveform from C0h to BFh. Numerical figures 1100 0000B and 1011 1111B show figures in the binary system.

As explained above, the present invention has following effects. The first effect is that at the transmission of the digital voice data, the breaking of voice reproduction, that is, silent time caused by the insertion of the escape codes in the frame of communication channel at the reception side is able to be prevented. With this, it becomes easy to listen the voice. The reason is that the codes to be escaped are converted to the codes not to be escaped beforehand and the escape codes are not inserted in the voice data of the frame and the transmitting time is not increased.

The second effect is that the transfer rate of the communication channel is not needed to be high in large degree for the baud rate of the digital voice data. With this, the small size of equipment and low power consumption are able to be realized. The reason is that the margin for the increase of the transmitting time by the insertion of the escape codes is not needed to be large.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A voice transmitter which transmits digitally encoded voice data obtained by sampling an analog voice waveform and uses a transmitting process utilizing escape codes as a means for implementing data transmission of codes equivalent to control codes used in a communication channel, said voice transmitter comprising:
a code converter means which detects data equivalent to one of the control codes present in the digitally encoded voice data and converts the data equivalent to one of the control codes to non-control code data without increasing a size of the digitally encoded voice data.

2. The voice transmitter in accordance with claim 1, wherein said converter means further comprises:
a substituting means for substituting the non-control code for one of the control codes in which the non-control code corresponds to a value of one of 1 less than and 1 more than a value of the control codes.

3. The voice transmitter in accordance with claim 2, wherein the digitally encoded voice data are generated by an ADPCM system.

4. The voice transmitter in accordance with claim 2, wherein the digitally encoded voice data are generated by an PCM system.

5. The voice transmitter in accordance with claim 1, wherein the digitally encoded voice data are generated by an ADPCM system.

6. The voice transmitter in accordance with claim 1, wherein the digitally encoded voice data are generated by an PCM system.

7. A voice transmitter for transmitting digital voice data code obtained by sampling an analog voice waveform, and uses a transmitting process implementing data transmission codes in a communication channel, said transmitter comprising:
a code converter which detects digital voice data code equivalent to one of the transmission codes and converts the code equivalent to one of the transmission codes to a non-transmission code without altering digitally encoded voice data length.

8. The voice transmitter in accordance with claim 7, wherein said code converter means further comprises a substituting means for substituting the non-transmission code wherein the non-transmission code has a value being one of 1 less than or 1 more than the transmission code.

9. The voice transmitter in accordance with claim 8, wherein the digitally encoded voice data code are generated by an ADPCM system.

10. The voice transmitter in accordance with claim 8, wherein the digitally encoded voice data code are generated by an PCM system.

11. The voice transmitter in accordance with claim 7 wherein the digitally encoded voice data code are generated by an ADPCM system.

12. The voice transmitter in accordance with claim 7, wherein the digitally encoded voice data code are generated by an PCM system.

13. A method of analog to digital voice transmission which uses a transmitting process implementing data transmission codes in a communication channel, said method comprising:

detecting code within a digitized voice data which corresponds to one of the transmission codes;

converting the detected code to a converted code; and replacing the detected code with the converted code in the digital voice data without altering digital voice data length.

14. The method in accordance with claim 13, wherein said converting the detected code converts the detected to the converted code having a value 1 less than or 1 more than a value of the detected code.

15. The method in accordance with claim 14, further comprising generating the digital voice data by an ADPCM system.

16. The method in accordance with claim 14, further comprising generating the digital voice data by an PCM system.

17. The method in accordance with claim 13, further comprising generating the digital voice data by an ADPCM system.

18. The method in accordance with claim 13, further comprising generating the digital voice data by an PCM system.

* * * * *